US010209425B2

(12) United States Patent
Prais

(10) Patent No.: US 10,209,425 B2
(45) Date of Patent: Feb. 19, 2019

(54) COMPONENT ILLUMINATION APPARATUS, SYSTEMS, AND ELECTRONIC DEVICES AND METHODS OF MANUFACTURING AND USING THE SAME

(71) Applicant: Ascensia Diabetes Care Holdings AG, Basel (CH)

(72) Inventor: Eugene Prais, West Milford, NJ (US)

(73) Assignee: Ascensia Diabetes Care Holdings AG, Basel (CH)

( * ) Notice: Subject to any disclaimer, the term of this patent is extended or adjusted under 35 U.S.C. 154(b) by 0 days.

(21) Appl. No.: 15/990,531

(22) Filed: May 25, 2018

(65) Prior Publication Data

US 2018/0275332 A1    Sep. 27, 2018

Related U.S. Application Data

(62) Division of application No. 14/723,117, filed on May 27, 2015, now Pat. No. 9,983,341, which is a division
(Continued)

(51) Int. Cl.
*F21V 8/00* (2006.01)
*H04M 1/22* (2006.01)
*H04M 1/02* (2006.01)

(52) U.S. Cl.
CPC ......... *G02B 6/0028* (2013.01); *G02B 6/0018* (2013.01); *G02B 6/0076* (2013.01);
(Continued)

(58) Field of Classification Search
CPC .. G02B 6/0018; G02B 6/0028; G02B 6/0076; H04M 1/22; H04M 1/0266; Y10T 29/49286
See application file for complete search history.

(56) References Cited

U.S. PATENT DOCUMENTS 5,975,711 A    11/1999    Parker et al.
7,034,799 B2    4/2006    Lee
(Continued)

FOREIGN PATENT DOCUMENTS

DE    19918053    11/2000
EP    2025994    2/2009
(Continued)

OTHER PUBLICATIONS

International Search Report and Written Opinion of International Application No. PCT/US2012/023331 dated Sep. 14, 2012.
(Continued)

*Primary Examiner* — Stephen F Husar
(74) *Attorney, Agent, or Firm* — Dugan & Dugan, PC

(57) ABSTRACT

Apparatus for illuminating one or more components of an electronic device having a visual display (e.g., a backlit display), such as one or more keys of keyboards, one or more interface ports, or one or more external surfaces are disclosed. In one or more embodiments, a component illumination apparatus has a visual display and a light guide optically coupled to the visual display and that is adapted to illuminate one or more components external to the visual display. Methods of component illumination and illumination systems are described, as are other embodiments.

20 Claims, 9 Drawing Sheets

Related U.S. Application Data of application No. 13/362,772, filed on Jan. 31, 2012, now Pat. No. 9,071,676.

(60) Provisional application No. 61/439,132, filed on Feb. 3, 2011.

(52) U.S. Cl.
CPC ........... H04M 1/0266 (2013.01); H04M 1/22 (2013.01); *Y10T 29/49826* (2015.01)

(56) References Cited

U.S. PATENT DOCUMENTS

| | | | | |
|---|---|---|---|---|
| 9,071,676 B2 * | 6/2015 | Prais | .................... | H04M 1/0266 |
| 9,983,341 B2 * | 5/2018 | Prais | .................... | H04M 1/0266 |
| 2004/0052066 A1 | 3/2004 | Funamoto et al. | | |
| 2005/0259939 A1 | 11/2005 | Rinko | | |
| 2006/0274548 A1 | 12/2006 | Chang et al. | | |
| 2009/0059618 A1 | 3/2009 | Onikiri | | |
| 2012/0201048 A1 | 8/2012 | Prais | | |
| 2015/0253483 A1 | 9/2015 | Prais | | |

FOREIGN PATENT DOCUMENTS

| | | |
|---|---|---|
| JP | 2001-358816 | 12/2001 |
| JP | 2003-302635 | 10/2003 |

OTHER PUBLICATIONS

International Preliminary Report on Patentability and Written Opinion of International Application No. PCT/US2012/023331 dated Aug. 15, 2013.

European Search Report of European Application No. 12707678.4 dated Oct. 25, 2018.

* cited by examiner

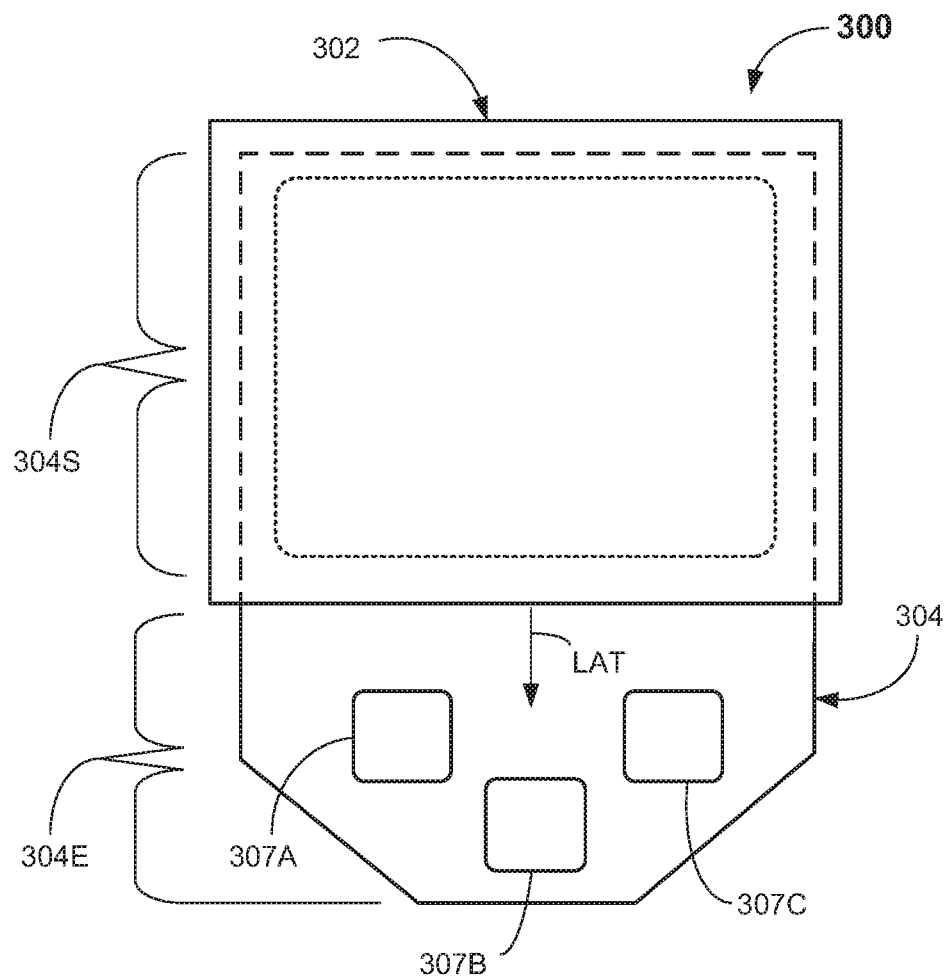

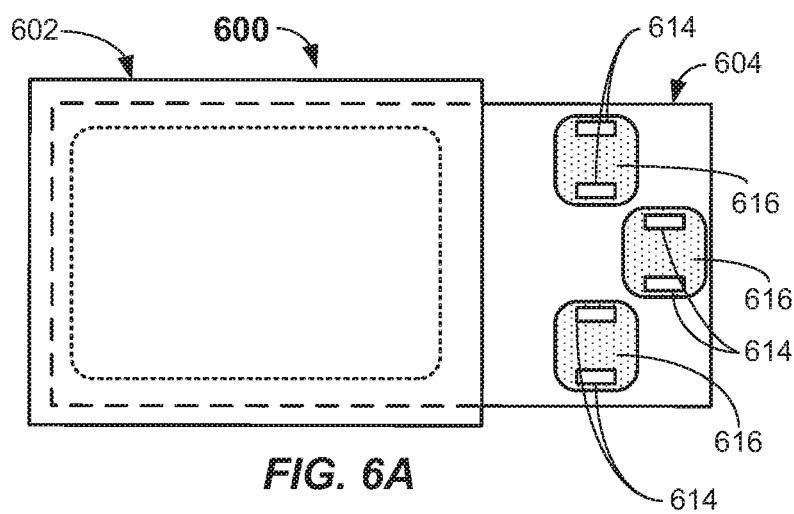
*FIG. 6A*
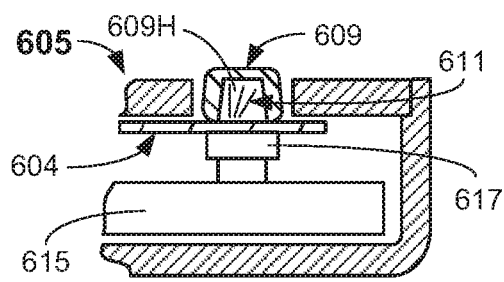
*FIG. 6B*
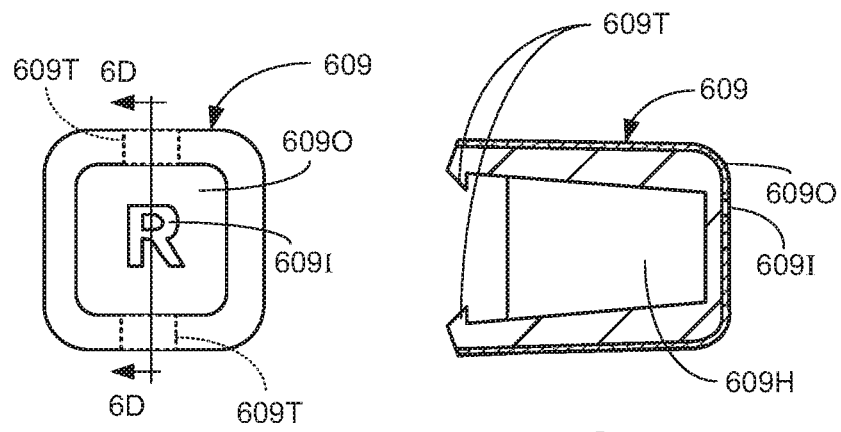
*FIG. 6C*    *FIG. 6D*

COMPONENT ILLUMINATION APPARATUS, SYSTEMS, AND ELECTRONIC DEVICES AND METHODS OF MANUFACTURING AND USING THE SAME

RELATED APPLICATIONS

This is a division of U.S. patent application Ser. No. 14/723,117, filed May 27, 2015, now U.S. Pat. No. 9,983,341, which is a division of U.S. patent application Ser. No. 13/362,772, filed Jan. 31, 2012, now U.S. Pat. No. 9,071,676, which claims priority to U.S. Provisional Patent Application No. 61/439,132, filed Feb. 3, 2011, each of which is hereby incorporated by reference herein in its entirety for all purposes.

FIELD

The present invention relates generally to apparatus, systems, and methods adapted to illuminate components such as keys or buttons in electronic devices.

BACKGROUND

Electronic devices, such as cell phones, blood analyte meters (e.g., blood glucose meters (BGMs)), continuous glucose meters (CGMs), personal digital assistants (PDAs), etc., have become an integral part of everyday life. In certain instances it can be desirable or needed to access such electronic devices in relatively low light conditions (e.g., at night). However, existing systems for providing such illumination to keys of such devices can require a separate light source. Accordingly, such systems tend to be complex, expensive, and can require additional power.

Accordingly, apparatus, systems, and methods that can allow for enhanced access/operation of such electronic devices in low light conditions and/or that reduce the complexity of providing such illumination can be desirable.

SUMMARY

According to a first embodiment, a component illumination apparatus is provided. The apparatus comprises a visual display, and a light guide optically coupled to the visual display and extending from the visual display and adapted to illuminate one or more components external to the visual display.

In a system embodiment, an illumination system is provided. The system comprises a visual display, and a light guide coupled to the visual display and extending exterior to the visual display to a position proximate to one or more components wherein the light guide is operable to illuminate the one or more components.

In another embodiment, an electronic device is provided. The electronic device comprises a visual display, and a light guide optically coupled between the visual display and one or more components of the electronic device external to the visual display wherein light from the visual display travels in the light guide to illuminate the one or more components.

In a method embodiment, a method of illuminating one or more components of an electronic device is provided. The method comprises providing a visual display, and channeling light from the visual display through a light guide to illuminate the one or more components wherein the one or more components are external to the visual display.

In another method embodiment, a method of manufacturing a component illumination apparatus is provided. The method comprises providing a light guide, and sandwiching the light guide between at least two elements of a visual display wherein the light guide extends external to the visual display.

These and other features of the present teachings are set forth herein.

BRIEF DESCRIPTION OF THE DRAWINGS

FIG. 3A shows a top plan view of another embodiment of a component illumination apparatus according to an embodiment of the invention.

FIG. 6A shows a top plan view of another embodiment of a component illumination apparatus according to an embodiment of the invention.

FIG. 6B shows a partial cross-sectioned side view of a portion of another electronic device including a component illumination apparatus providing under-key illumination according to an embodiment of the invention.

FIG. 6C shows a top plan view of a key adapted to be illuminated by providing under-key illumination according to an embodiment of the invention.

FIG. 6D shows a side cross-sectioned view of the key of FIG. 6C taken along section line "6D-6D."

DETAILED DESCRIPTION

Figure 1:
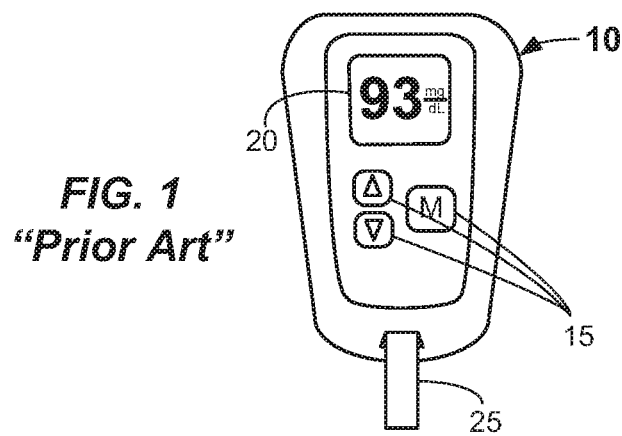
FIG. 1 shows a front view illustration of an exemplary BGM according to the Prior Art.

A hand-held electronic device 10 is illustrated in FIG. 1. The hand-held electronic device 10, in the depicted embodiment, is a BGM according to the prior art. The BGM device 10 can include one or more keys 15 adapted to allow a user to interface with, and operate, the device 10, and a visual display 20 that is adapted to display information to the user. In this embodiment, the visual display 20 communicates analyte test results (e.g., glucose readings) obtained from the testing of a biological fluid (e.g., blood) applied to a test strip 25. In some instances, it may be desired or necessary for the device 10 to be used in low light conditions (e.g., at night). In current hand-held devices, backlighting of the keys can be provided. However, such backlighting typically requires an additional light source, which adds complexity and expense, and can possibly add additional power requirements.

In view of the foregoing difficulties, there is a need for apparatus, systems, and methods where the illumination of one or more components (e.g., one or more keys, ports, external surfaces) of an electronic device is seamlessly and simply achieved. To address this need, embodiments of the present invention provide a component illumination apparatus, illumination systems, and electronic devices including the component illumination apparatus, as well as methods of manufacturing and using the component illumination apparatus.

In particular, according to one or more embodiments, a component illumination apparatus is provided comprising a visual display, and a light guide optically coupled to the visual display and extending from the visual display. The component illumination apparatus is adapted and configured to illuminate one or more components external to the visual display (e.g., one or more keys, ports, external surfaces). Embodiments including backlit visual displays are described, as are other embodiments.

In another embodiment, an illumination system is provided comprising a visual display, and a light guide optically coupled to the visual display and extending exterior to the visual display to a position proximate to one or more components and operable to illuminate the one or more components.

Also disclosed are electronic devices comprising a visual display, and a light guide optically coupled between the visual display and one or more components of the electronic device. Light produced by the visual display travels in the light guide to illuminate the one or more components.

These and other embodiments of apparatus, systems, electronic devices and methods of using and manufacturing the present invention are described below with reference to FIGS. 2A-10 herein.

Figure 2A:
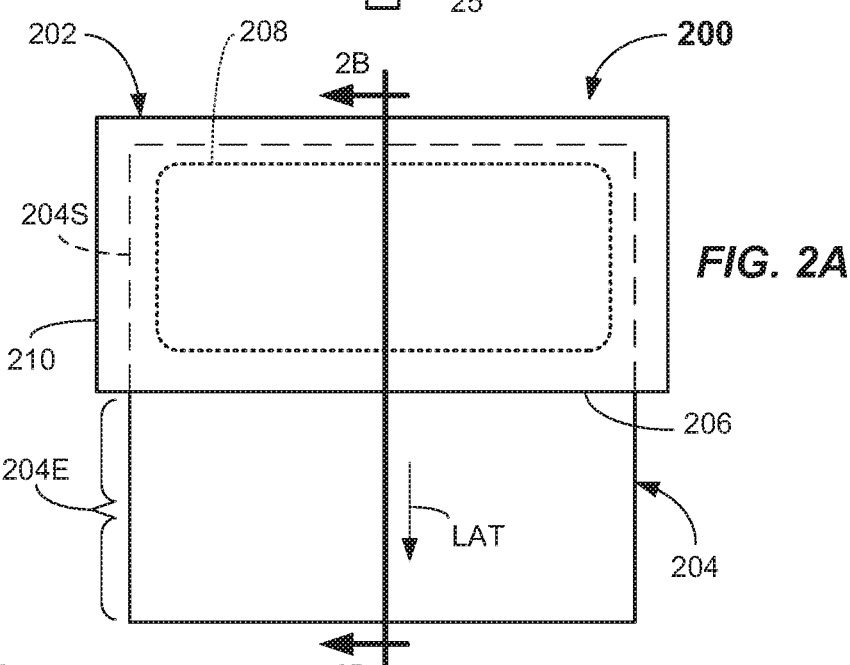
FIG. 2A shows a top plan view of an embodiment of a component illumination apparatus according to an embodiment of the invention.
Figure 2B:
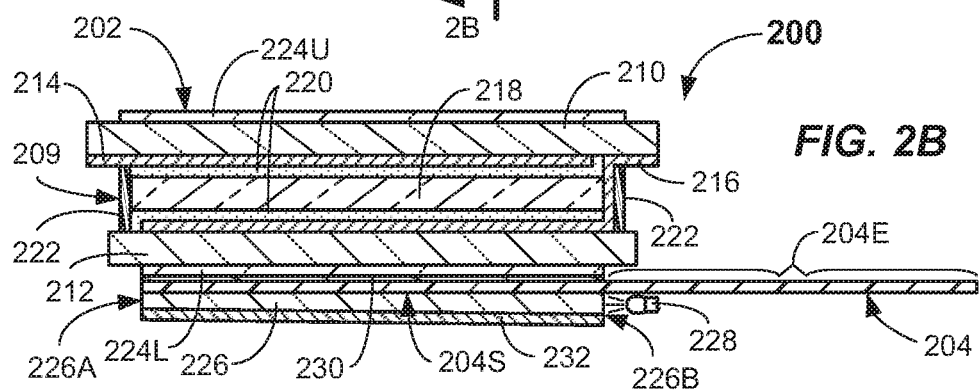
FIG. 2B shows a cross-sectioned side view diagram of the component illumination apparatus of FIG. 2B taken along section line "2B-2B."
Figure 2C:
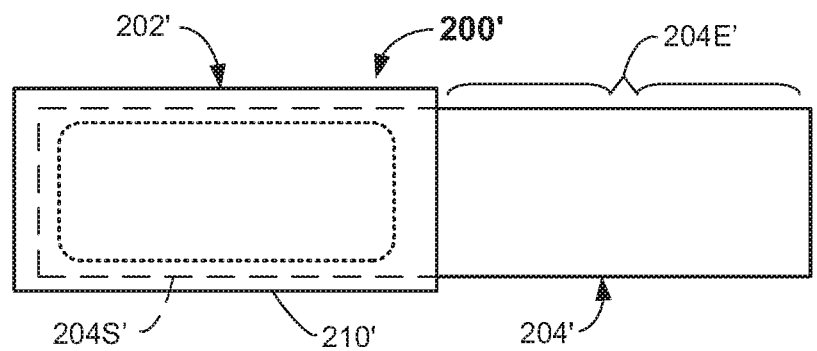
FIG. 2C shows a top plan view of an alternative embodiment of a component illumination apparatus according to an embodiment of the invention.

Referring now to FIG. 2A-2B, a non-limiting embodiment of a component illumination apparatus 200 is provided. In particular, the component illumination apparatus 200 can comprise a visual display, such as a backlit visual display 202, and a light guide 204 directly optically coupled to the backlit visual display 202. The light guide 204 comprises a portion extending from the backlit visual display 202. As will be discussed in more detail below, the component illumination apparatus 200 can be included in any suitable electronic device, such as a laptop personal computer (PC), handheld or pocket personal computer (HPC), compatible personal digital assistant (PDA), smart cellular phone, or medical device (e.g., an analyte testing meter such as a BGM, CGM, and the like), for example. Other types of electronic devices, i.e., those including a processor, memory, and a backlit visual display can benefit from one or more embodiments of the invention.

Again referring to the embodiment of FIG. 2A-2B, the light guide 204 comprises two portions; a sandwiched portion 204S and an extending portion 204E. The sandwiched portion 204S is sandwiched in between two or more elements of the backlit visual display 202. The extending portion 204E extends beyond the footprint (projected area in top plan view) of the backlit visual display 202. For example, as shown in FIG. 2A, the overall area in a top plan view of the light guide 204 is larger (e.g., substantially larger) than an overall plan area of the backlit visual display 202. In the depicted embodiment, the light guide 204 extends in a lateral direction (along arrow labeled LAT) from a first side 206 of the backlit visual display 202. The sandwiched portion 204S (shown dotted in FIG. 2A) can be equal to or slightly larger in plan area than a viewing window 208 of the backlit visual display 202.

In more detail, the backlit visual display 202 can comprise various elements provided in a laminated configuration. As depicted in FIG. 2B, the backlit visual display 202 comprises a display assembly 209 (e.g., a liquid crystal display (LCD) assembly) including a top glass 210, a bottom glass 212, a segment electrode 214, a common electrode 216, a liquid crystal 218, an orientation layer 220, a sealant 222 provided around the periphery, and polarizing plates 224U, 224L provided on the upper and lower surfaces of the top and bottom glasses 210, 212, respectively. Other functional elements can be included. Also, it should be understood that although the light guide 204 is shown optically coupled to a LCD assembly, it can be optically coupled to other types of display assemblies such as organic light emitting diode (OLED) displays, light emitting diode (LED) displays, liquid crystal on silicon (LCoS) displays, Thin film transistor (TFT) displays, plasma displays, and other illuminated displays. The light guide 204 can be optically coupled with other displays such as digital light processing (DLP) displays, direct drive image light amplifier (D-ILA) displays, and Cathode Ray Tube (CRT) displays. The light guide 204 can be directly optically coupled in any suitable way so that some portion of the light from the display is channeled into the light guide 204.

Below the display assembly 209, the light guide 204 is provided. In some embodiments, the light guide 204 can be a sheet of transparent material being laminated into the backlit visual display 202. The light guide 204 can comprise a sheet of polycarbonate, acetate, polystyrene, polymethyl methacrylate (PMMA), or polysulfone material. Other suitable transparent or low optical loss materials can be used. In some embodiments, even slightly opaque or translucent materials can be used. The light guide 204 preferably has a relatively thin thickness dimension. For example, the light guide 204 can comprise a sheet having a thickness of between about 0.1 mm and about 5 mm. Other thicknesses can be used.

In some embodiments, the light guide 204 can include one or more colored portions or can be entirely colored. For example, the material of the light guide 204 can include an internal colorant or dye. For example, the light guide 204 can include a yellow, green, red, blue, or orange tint such that the light emanating from the light guide 204 will appear to illuminate with that particular color of light. Any color can be used. The colors can also be provided by applying a colored film layer on the light guide 204 at one or more portions thereof (e.g., on a top, bottom, or end surface or any combination thereof). Different colors can be provided for different areas being illuminated by the light guide 204. For example, different buttons can have different colors of illumination.

In more detail, the sandwiched portion 204S of the light guide 204 can be provided proximate to, and preferably in direct optical contact with, a backlight receiver 226. The backlight receiver 226 can also be constituted of a transparent material and can include a wedge shape wherein a first terminal edge 226A is relatively thinner that an opposite terminal edge 226B. The backlight receiver 226 is configured and adapted to receive light at the terminal edge 226B from a backlight source 228 and channel a first portion of the light to the display assembly 209. A second portion of the light generated by the backlight source 228 is channeled into the light guide 204 and is adapted and functional to be used to illuminate one or more components that are located external to the backlit visual display 202. For example, the light guide 204 can be configured and adapted to illuminate one or more components (e.g., keys, buttons, ports, cables, external surfaces, or the like) of an electronic device having the component illumination device 200 received as a subcomponent therein. In some embodiments, the backlight receiver 226 and the sandwiched portion 204S of the light guide 204 can optionally be formed integrally. In other embodiments, the light source could be located beneath a diffuser plate rather than proximate to an end thereof.

In the depicted embodiment, the sandwiched portion 204S of the light guide 204 is provided proximate, and preferably in direct contact with, a diffuser 230. The diffuser 230 can be a sheet of light conducting material having a geometry that effectively functions to diffuse the light more evenly to the display assembly 209. A polycarbonate material can be used for the diffuser 230. Other materials can also be used. In some embodiments, the sandwiched portion 204S of the light guide 204 is sandwiched directly between the backlight receiver 226 and the diffuser 230. However, the light guide 204 can be laminated/sandwiched at other locations in the backlit visual display 202 and can also work acceptably. Additionally, the backlit visual display 202 can include a reflector 232. The reflector 232 can be a sheet of suitably reflective material, such as a coated polymer film material. The light guide 204 can be positioned between the reflector 232 and the display assembly 209. Other films can be provided, such as brightness-enhancing films.

In the depicted embodiment of FIG. 2A-2B, the extending portion 204E of the light guide 204 can be made of any suitable size and shape that extends laterally beyond the first side 206 of the top glass 210. However, it should be recognized that, in some embodiments, the extending portion of a light guide 204' of a component illumination apparatus 200' can extend laterally from the top glass 210' and the sandwiched portion 204S' of the backlit visual display 202' in other directions, such as is optionally shown in FIG. 2C wherein the light guide extending portion 204E' extends in a second lateral direction. The backlit display 202' may be constructed as described herein.

Figure 2D:
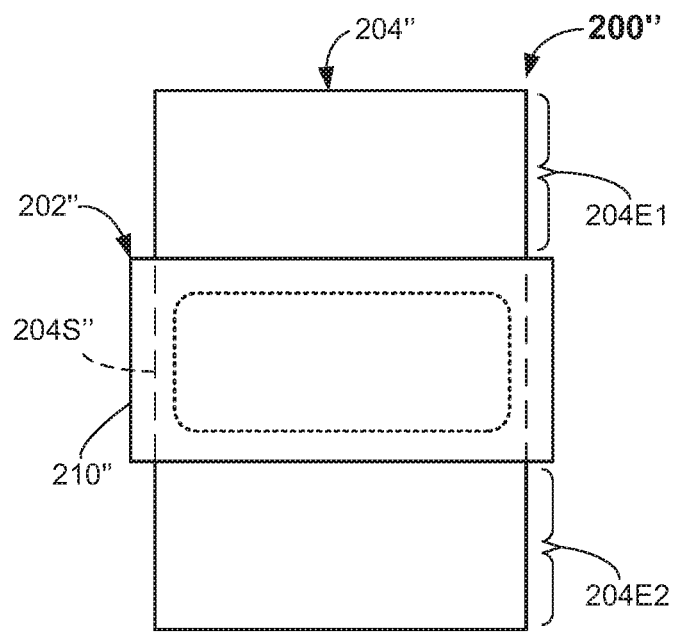
FIG. 2D shows a top plan view of another alternative embodiment of a component illumination apparatus according to an embodiment of the invention.

Optionally, a light guide 204" of a component illumination apparatus 200" can comprise multiple extending portions 204E1 and 204E2, such as is shown in FIG. 2D. The extending portions 204E1 and 204E2 can extend laterally from the top glass 210" and sandwiched portion 204S" of a backlit visual display 202" in two or more directions. In the depicted embodiment, the extending portions 204E1 and 204E2 extend in two opposed lateral directions. However, the extending portions 204E1 and 204E2 can extend in any combination of lateral directions including directions that are perpendicular, for example. The backlit display 202" may be constructed as described herein.

Figure 3B:
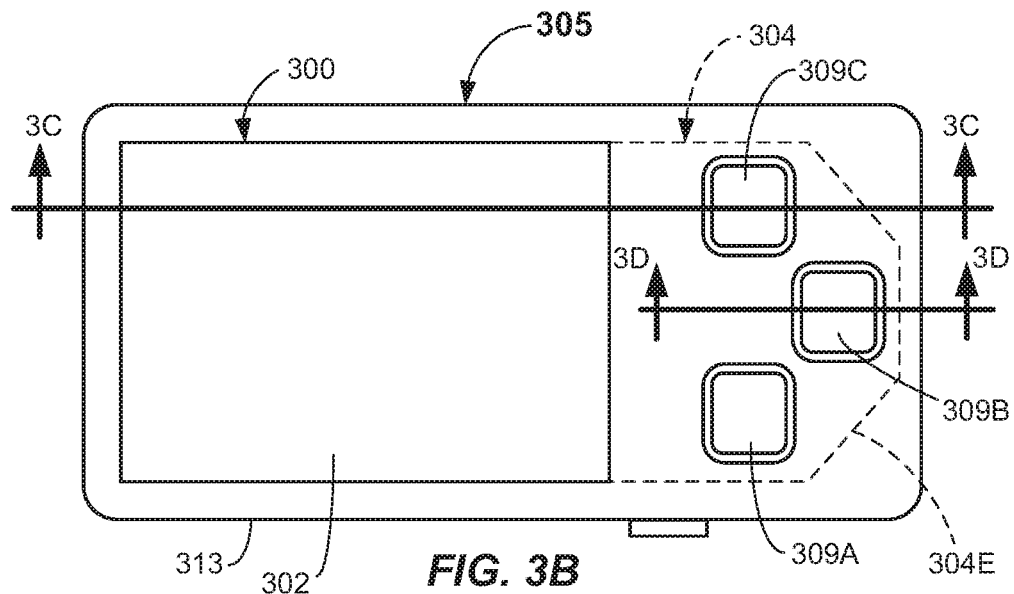
FIG. 3B shows a top plan view of an embodiment of an electronic device including a component illumination apparatus according to an embodiment of the invention.
Figure 3C:
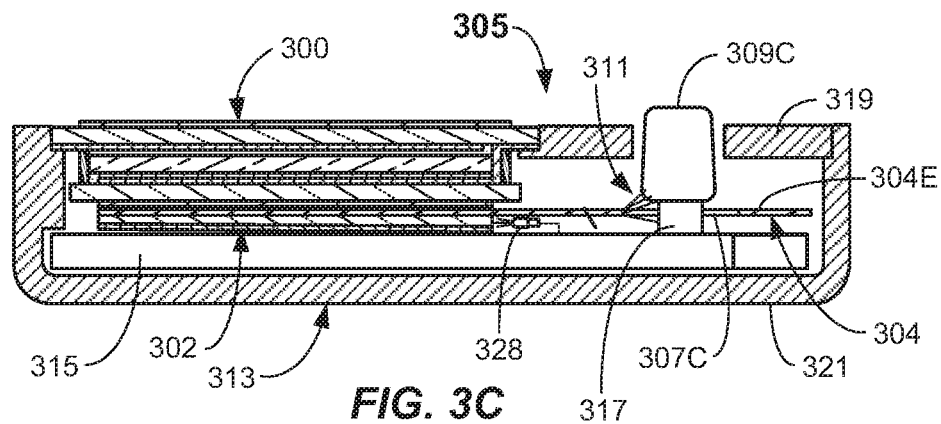
FIG. 3C shows a cross-sectioned side view of the electronic device of FIG. 3B taken along section line "3C-3C."

Now referring to FIGS. 3A-3C, another embodiment of the component illumination apparatus 300 and an electronic device 305 including the component illumination apparatus 300 are shown. As before, as best shown in FIG. 3A, the light guide 304 comprises two portions, a sandwiched portion 304S and an extending portion 304E. The sandwiched portion 304S is sandwiched in between two or more elements of the backlit visual display 302. The extending portion 302E extends beyond the footprint (in top plan view) of the backlit visual display 302. In the depicted embodiment, the light guide 304 extends in a lateral direction (along arrow labeled LAT) from the backlit visual display 302. However, one or more extending portions may extend in one or more additional directions. The extending portion 304S can exhibit a polygonal shape that is non-rectangular. In the depicted embodiment, the extending portion can include one or more holes (e.g., holes 307A, 307B, and 307C) formed therein. The number of holes can be selected to be the same as the number of components (e.g., keys) to be illuminated. The one or more holes 307A, 307B, 307C can be positioned adjacent to a component to be illuminated. For example, as shown in FIGS. 3B-3C, the holes 307A, 307B, and 307C are shown aligned with a position of one or more components (e.g., keys 309A, 309B, and 309C) of the electronic device 305. In operation, a light portion 311 (shown as rays of light) carried by the light guide 304 emerge from the hole 307C and illuminate a portion of the key 309C and areas surrounding the key 309C, for example. The other keys 309A, 309B can be illuminated in a like manner. As shown, the electronic device 305 can include a housing 313 receiving the component illumination device 300 and a control board 315. Control board 315 can include a suitable digital microprocessor, memory, power management, display interface, device interface, analog interface, and power source, for example. Other combinations of components can be provided. The control board 315 can interface with and operate the light source 328 of the backlit visual display 302 and electrically couple with contacts of the keys 309A-309C. Keys 309A-309C can be mounted to the control board 315 or on a separate board or component that interfaces with the control board 315. As shown, a portion the keys 309A-309C or a key interface portion 317 extends through the holes 307A-307C such the extending portion 304E resides at a position below the upper cover 319 and above the lower cover 321 of the housing 313 of the electronic device 305 thereby illuminating the keys 309A-309C, and the spaces between the keys 309A-309C and upper cover 319 from inside of the housing 313.

Figure 3D:
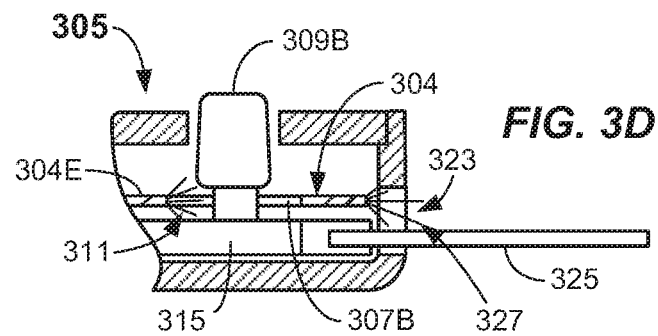
FIG. 3D shows a cross-sectioned side view of an alternative embodiment of an electronic device including a component illumination apparatus adapted to illuminate a port of the electronic device according to an embodiment of the invention.

Now referring to FIG. 3D, the light guide 304 optionally can be used to illuminate portions of a component (e.g., a port 323) of the electronic device 305. For example, in some embodiments, a port 323 of an analyte meter that is adapted to receive an analyte test sensor 325 (sometimes referred to as a "test strip") is adapted to be illuminated. The electronic device 305 (e.g., an analyte meter) can receive the analyte test sensor 325 inserted in the port 323 by a user or otherwise loaded from within the electronic device 305 and the analyte test sensor 325 can engage a suitable interface on or coupled to the circuit board 315, for example. Another light portion 327 of the light channeled in the light guide 304 can project out of the end of the light guide 304 and is suitably proximately positioned to illuminate portions of the port 323 and/or the analyte test sensor 325. Other types of ports, including multiple ports, can be illuminated by the light guide 304 in a like manner.

Figure 4A:
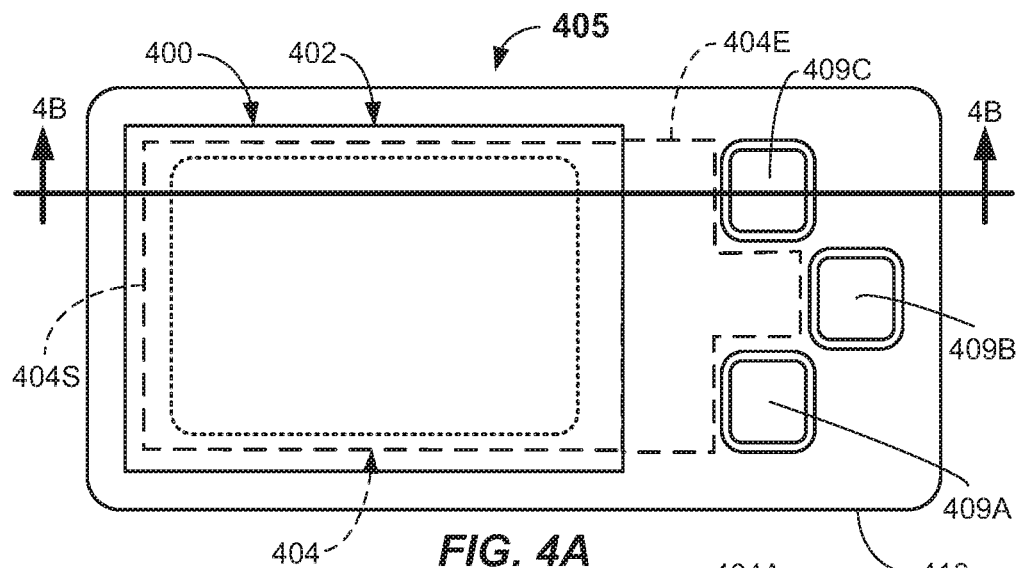
FIG. 4A shows a top plan view of another embodiment of an electronic device including a component illumination apparatus according to an embodiment of the invention.
Figure 4B:
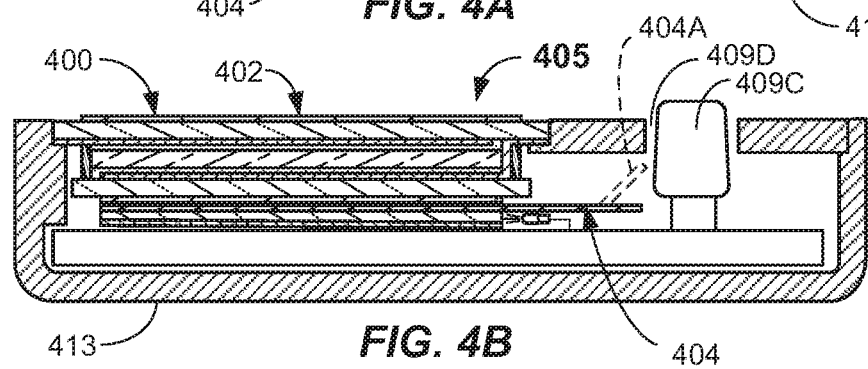
FIG. 4B shows a cross-sectioned side view of the electronic device of FIG. 4A taken along section line "4B-4B."
Figure 4C:
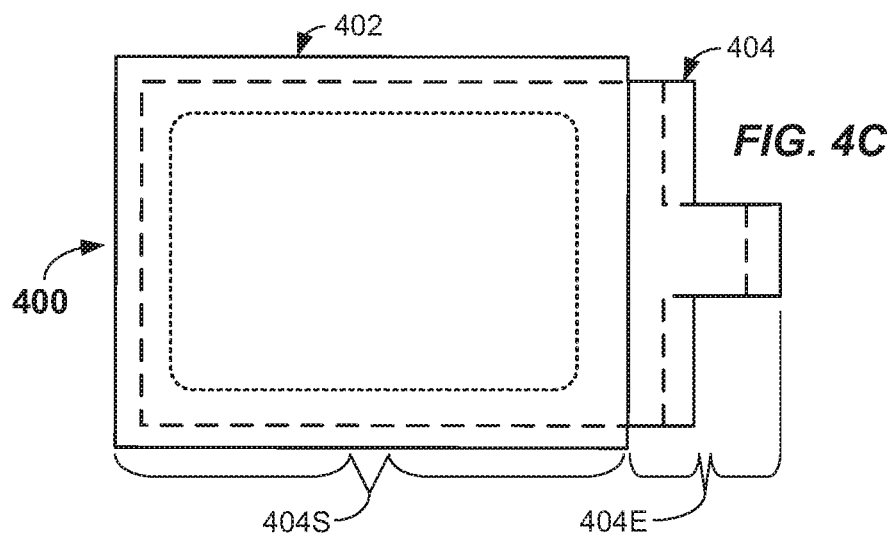
FIG. 4C shows a top plan view of a component illumination apparatus included within the electronic device of FIGS. 4A and 4B.

FIGS. 4A-4C illustrate yet another embodiment of component illumination apparatus 400 and an electronic device 405 including the component illumination apparatus 400. As before, a light guide 404 as previously described comprises two portions, a sandwiched portion 404S and an extending portion 404E. The sandwiched portion 404S is sandwiched in between two or more elements of the backlit visual display 402. The extending portion 404E extends beyond the footprint (in top plan view) of the backlit visual display 402. In the depicted embodiment, the light guide 404 extends in a lateral direction from the backlit visual display 402. The extending portion 404S can exhibit a polygonal shape that is non-rectangular. In the depicted embodiment, the extending portion 404E extends to a position proximate a component (e.g., one or more keys) and can terminate at or very near the component. Light portions are emitted at the component or to a position closely proximate to the component. For example, the light guide 404 can be aligned with a position of one or more components (e.g., keys 409A, 409B, 409C) of the electronic device 405, or can be directed at a gap or space between the component and a housing 413 of the electronic device 405.

As such, a light portion of the light carried by the light guide 404 emerges from the terminal end of the light guide 404 and illuminates a portion of the one or more keys 409A-409C and spaces surrounding the one or more keys 409A-409C, for example. As shown, the light guide 404 can be planar, or optionally can be non-planar. For example, the light guide 404 can include a bend enabling the light to be positioned to preferentially illuminate portions of a component. As shown by dotted lines 404A, the extending portion of the light guide 404 can include one or more bends. Accordingly, the light guide 404 can be aimed at a component that is not in line with a plane of the sandwiched portion 404S, such as a space 409D between the key and housing, for example.

Figure 5A:
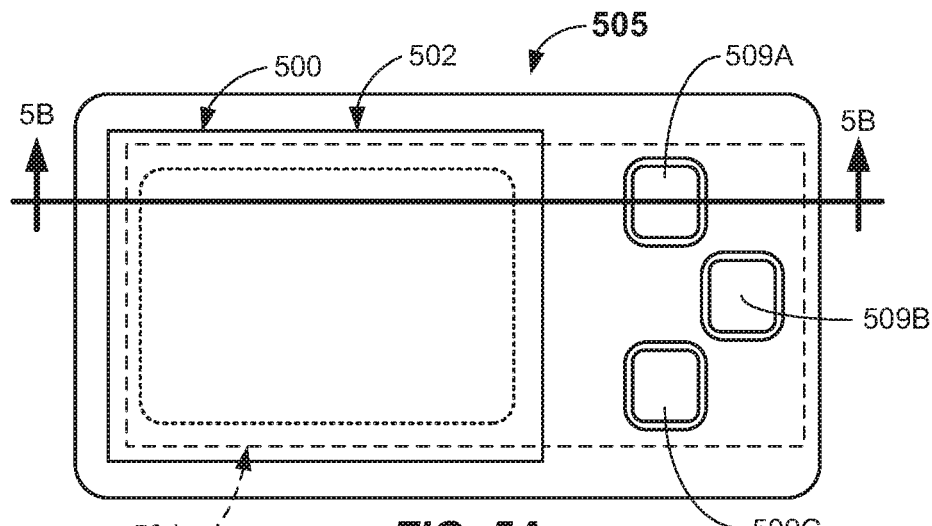
FIG. 5A shows a top plan view of another embodiment of an electronic device including a component illumination apparatus according to an embodiment of the invention.
Figure 5B:
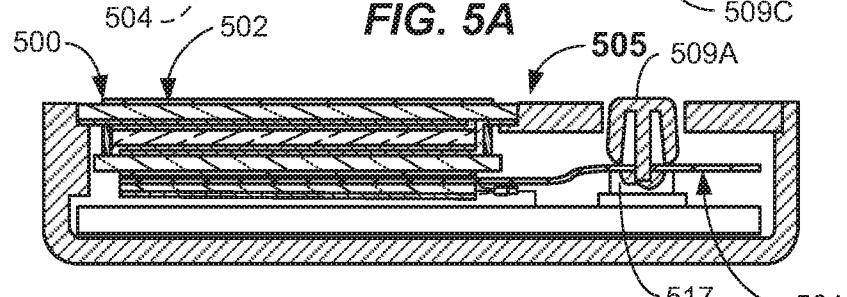
FIG. 5B shows a cross-sectioned side view of the electronic device of FIG. 5A taken along section line "5B-5B."
Figure 5C:
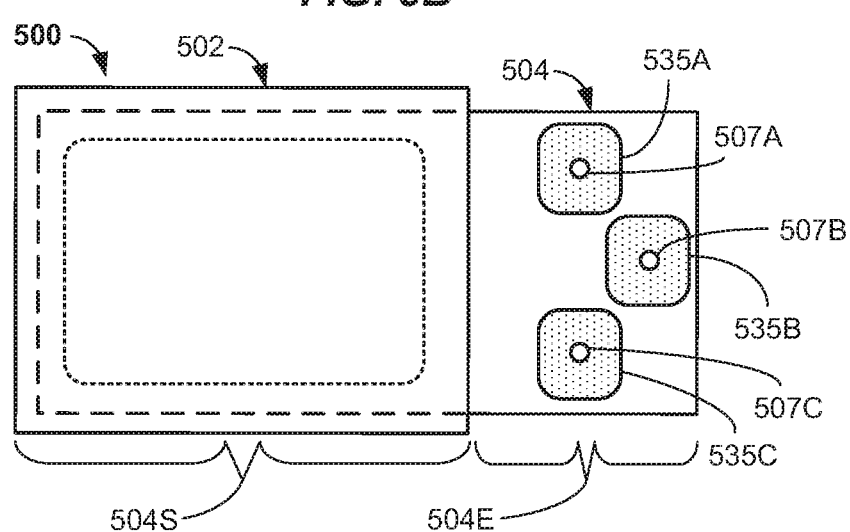
FIG. 5C shows a top plan view of a component illumination apparatus included within the electronic device of FIG. 5A.

FIGS. 5A-5C illustrate another embodiment of a component illumination apparatus 500 and an electronic device 505 including same. The component illumination apparatus 500 and an electronic device 505 are the same as described in the previous embodiment including a sandwiched portion 504S and extending portion 504E, except that the extending portion 504E of the light guide 504 extending from the backlit visual display 502 can include one or more surface features (e.g., surface features 535A, 535B, and 535C) at one or more defined locations on the extending portion 504E. The surface features 535A, 535B, 535C are configured and operable to cause light portions to be emitted in a direction that is non-parallel to a plane of the extending portion 504E. In some embodiments, the surface features 535A, 535B, 535C comprise one or more roughened surface portions that are provided adjacent to the component to be illuminated. For example, as shown in FIGS. 5A-5C, the roughened surface portions 535A, 535B, 535C can be provided of an appropriate size to provide under-key or around-key illumination of keys 509A-509C. The roughened surface portions 535A, 535B, 535C can be roughened by grit blasting, impressing a suitably shaped and/or roughened die under heat and or pressure onto the upper surface of the extending portion 504E, or by molding. Holes 507A-507C can be cut with a die, as well.

For example, the light guide 504 can include the holes 507A-507C through which a connecting portion of each key 509A-509C is received and connected to an underlying portion 517 that lies below the extended portion 504E of the light guide 504. In this manner, the one or more keys (e.g., keys 509A-509C) and/or positions or spaces surrounding the keys can be illuminated. The extending portion 504E is suitably thin and flexible that the operation of the one or more keys (e.g., keys 509A-509C) is not appreciably affected. As shown, the extending portion 504E may be non-planar.

FIGS. 6A-6D illustrate yet another embodiment of component illumination apparatus 600 that can be included within an electronic device 605. In this embodiment, the component(s) (e.g., one or more keys 609) are illuminated by a light portion 611 emanating from the light guide 604. In the depicted embodiment, one key 609 is shown. However, the other keys can be functionally similar or identical. The keys (one key 609 shown) can include a hollow underside 609H and one or more tabs 609T that are configured and adapted to extend through one or more apertures 614 formed in the light guide 604 to attach the one or more keys 609 to one or more key interface portions 617 underlying the light guide 604. Each key interface portion 617 (only one shown, but all would generally be identical) can include electrical contacts that are adapted to communicate with the circuit board 615 and microprocessor thereof. Accordingly, the one or more keys 609 can be used to input data and instructions to the electronic device 605.

The light guide 604 can be sufficiently thin and flexible so that motion of the one or more keys 609 is not appreciably impeded thereby. Although tabs 609T are shown, any suitable mechanism for attaching the one or more keys 609 to the key interface portions 617 can be used. As can be seen in FIG. 6B, light channeled from the backlit display 602 in light guide 604 can progress towards the component (e.g., key 609) and an emitted light portion 611 can illuminate the underside of the one or more keys 609. As shown in FIG. 6C and FIG. 6D, the one or more keys 609 include an opaque portion 609O and a transparent (or translucent) portion 609I forming the indicia on the key 609. In the depicted embodiment, the indicia 609I (e.g., letter, number, picture, or symbol, etc.) can be translucent and the rest of the key 609 can be opaque (e.g., painted or coated) thereby forming the outline of the indicia. Accordingly, light portion 611 can illuminate the underside of the key 609, and, thus, the underside of the indicia 609I in low light conditions. This underside illumination causes the indicia 609I on the key 609 to appear illuminated when viewed by the user.

As in the previous embodiment, providing one or more surface features 616 on the surface of the light guide 604 can allow the light to be projected (e.g., upwardly) into the underside hollow portion 609H of the key 609. For example, any type of microstructure or roughened surface region 616 on the light guide 604 can be provided, as depicted in FIG. 6A. The microstructure or roughened surface region 616 can be roughened by mechanical means (by grit blasting, by impressing a suitably roughened surface under heat and/or pressure onto the light guide surface, or by molding). This surface feature 616 can cause a light portion 611 to emit from the light guide 604 in a direction that is non-parallel with a plane of the light channeled in the light guide 604 to provide localized illumination of the component.

Figure 7:
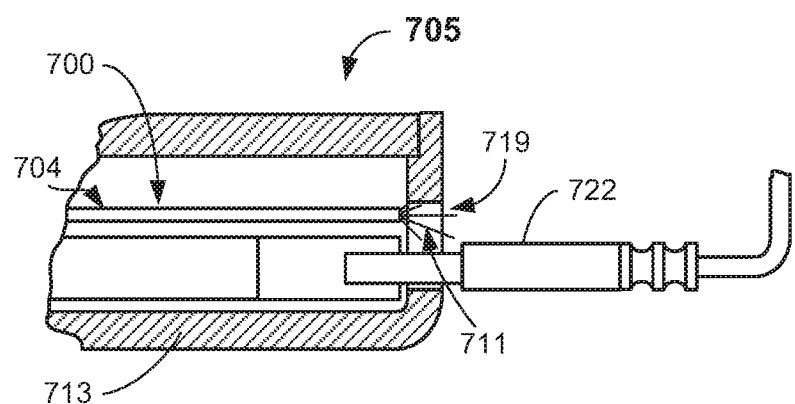
FIG. 7 shows a partial cross-sectioned side view illustrating another electronic device including a component illumination apparatus providing illumination of a port and cable component according to an embodiment of the invention

FIGS. 7 illustrates yet another embodiment of component illumination apparatus 700 (only the light guide portion shown, but the backlit display being the same as previously described in FIG. 2A) that can be included within an electronic device 705. In the depicted embodiment, the component to be illuminated is a port 719 of the electronic device 705 adapted to receive a communication cable 722 (e.g., a cable access port, such as a Universal Serial Bus (USB) port). The port 719 can comprise any opening in the housing 713 of the electronic device 705. A light portion 711 from the light guide 704 emanates from the terminal end of the light guide 704 and illuminates the port 719 and/or the communication cable 722, for example. Other types of communication cables and ports can be illuminated in a similar manner, such as microphone ports, speaker ports, charging ports, or the like.

Figure 8:
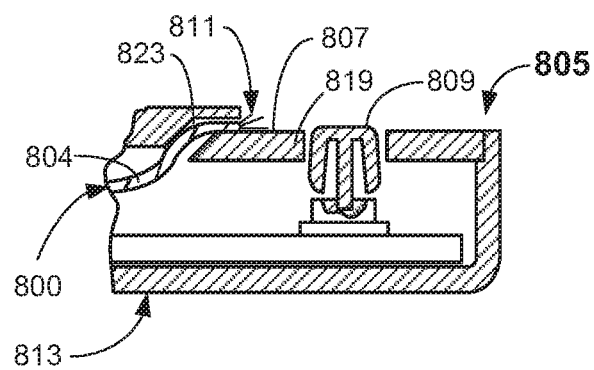
FIG. 8 shows a partial cross-sectioned side view illustrating another electronic device including a component illumination apparatus providing illumination of a surface of the electronic device according to an embodiment of the invention

FIG. 8 illustrates another embodiment of electronic device 805 wherein the light guide 804 from the component illumination device 800 (only the light guide 804 shown, but the backlit display being the same as previously described in FIG. 2A) is adapted to illuminate an external surface 807 of a component (e.g., top cover 819) of the electronic device 805. In particular, the light guide 804 can be flexed and received in a pocket 823 formed adjacent to the surface 807 that is to be illuminated. The pocket 823 can be formed by any suitable means such as by molding. For example, the light guide 804 can be loosely received therein. Optionally, the light guide can be mechanically fastened. In operation, a light portion 811 from the light guide 804 emanates from the terminal end of the light guide 804 and illuminates the surface 807 and can illuminate any other component nearby (e.g., a key 809). As should be appreciated, other surface portions of components of the housing 813 can be illuminated in a like manner.

Figure 9:
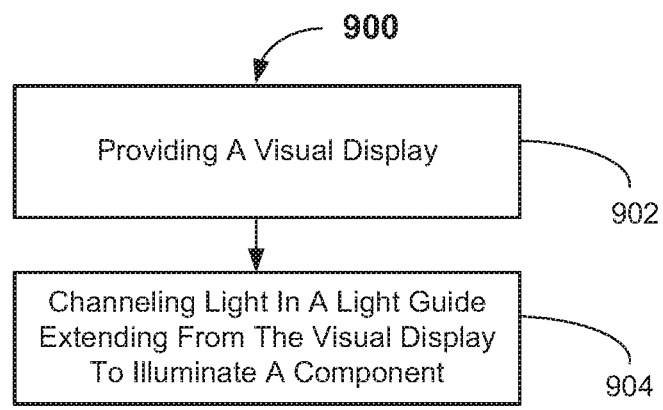
FIG. 9 shows a flowchart illustrating a method of using according to embodiments.

FIG. 9 illustrates, according to embodiments of the invention, a method of illuminating one or more components of an electronic device. In one or more embodiments, the method 900 comprises, in 902, providing a visual display (e.g., a backlit visual display such as backlit visual displays 202, 302, 402, 502, 602 or the like), and, in 904, channeling light from the visual display through a light guide (e.g., light guide 204, 304, 404, 504, 604, 704, 804 or the like) to illuminate one or more components, wherein the one or more components are external to the visual display. The light channeled is produced by the visual display. As described above, the one or more components can be one or more keys (e.g., keys 309A-309C, 409A-409C, 509A-509C, or the like) configured and adapted to be contacted by a user, one or more ports (e.g., port 719 or the like) configured and adapted to receive a communication cable (e.g., an audio port, a microphone port, interface cable port, a speaker port, or the like), a surface (e.g., surface 819) of a housing, or another component of the electronic device, or the like.

Figure 10:
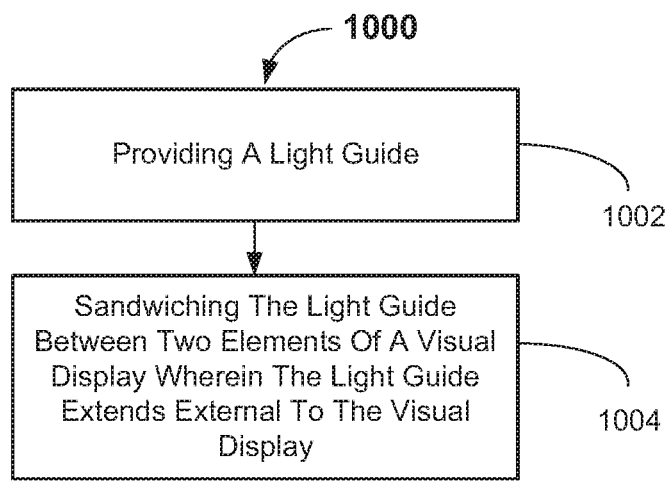
FIG. 10 shows a flowchart illustrating a method of manufacturing according to embodiments.

In another embodiment, a method of manufacturing a component illumination apparatus is provided. As shown in FIG. 10, the method 1000 comprises providing a light guide in 1002, and, in 1004, sandwiching the light guide between at least two elements of a visual display (e.g., a backlit visual display 202, 302, 402, 502, 602, or the like) wherein the light guide is configured to extend external to the visual display. The light guide can be sandwiched into the visual display at any convenient location, and can be fastened to the visual display by a suitable mechanical means (e.g., stacking components in a frame) or by an adhesive which is optically clear upon curing such as a single part cyanacrylate formulated for optical applications. In some embodiments, the light guide can be formed integrally with one or more adjacent elements of the visual display. As should be apparent from the foregoing, the light guide according to embodiments of the present invention extends from the body of the visual display and is adapted to illuminate any component of an electronic device.

The foregoing description discloses only example embodiments. It is not intended that the present teachings be limited to such embodiments. On the contrary, the present teachings encompass various alternatives, modifications, and equivalents, as will be appreciated by those of skill in the art. The section headings used herein are for organizational purposed only and are not to be construed as limiting the subject matter described in any way.

What is claimed is:

1. An electronic device, comprising:
a visual display including a backlight source; and
a light guide optically coupled to and extending between the backlight source and one or more components of the electronic device external to the visual display, wherein light from the visual display travels in the light guide to illuminate the one or more components, the one or more components including an interface port of the electronic device.

2. The electronic device of claim 1, wherein the light guide has a terminal end adjacent the interface port and wherein a light portion emanates from the terminal end to illuminate the interface port.

3. The electronic device of claim 2, wherein the terminal end of the light guide is positioned such that a cable coupled to the interface port is illuminated by the light portion emanating from the terminal end of the light guide.

4. The electronic device of claim 1, wherein the interface port includes at least one of a charging port, a universal serial bus (USB) port, a microphone port, a speaker port, and a communications port.

5. The electronic device of claim 1, wherein the light guide includes one or more colored portions or is entirely colored.

6. The electronic device of claim 5, wherein the light guide illuminates the interface port with a yellow, green, red, blue, or orange colored light.

7. The electronic device of claim 1, wherein the light guide comprises a sheet of transparent or low optical loss material.

8. The electronic device of claim 7, wherein the sheet of transparent or low optical loss material has a thickness ranging from 0.1 mm to 5.0 mm.

9. The electronic device of claim 1, wherein the light guide comprises a sandwiched portion and an extending portion, the sandwiched portion sandwiched between two or more elements of the visual display.

10. The electronic device of claim 9, wherein the extending portion extends beyond the visual display.

11. The electronic device of claim 1 further comprising a housing, wherein the interface port comprises an opening in the housing.

12. A method of illuminating one or more components of an electronic device, comprising:
providing a visual display;
channeling light from the visual display through a light guide; and
illuminating the one or more components including an interface port of the electronic device with light channeled from the visual display through the light guide, wherein the one or more components are external to the visual display.

13. The method of claim 12, wherein the illuminating the one or more components including the interface port includes illuminating at least one of a charging port, a universal serial bus (USB) port, a microphone port, a speaker port, and a communications port.

14. The method of claim 12, wherein the illuminating includes illuminating the one or more components including the interface port with colored light.

15. The method of claim 12, further comprising terminating the light guide at a termination end adjacent to and at an upper end of the interface port.

16. The method of claim 15, further comprising illuminating a cable coupled to the interface port, the cable coupled to the interface port below the termination end of the light guide.

17. The method of claim 12, further comprising sandwiching a portion of the light guide between two or more elements of the visual display.

18. A method of illuminating a component of an electronic device, the method comprising:
 illuminating a display;
 receiving light from the display via a light guide; and
 directing the received light through the light guide to illuminate a component of the electronic device wherein the component is external to the display and not within direct line of sight of the display, the component comprising an interface port.

19. The method of claim 18, wherein the interface port includes at least one of a charging port, a universal serial bus (USB) port, a microphone port, a speaker port, and a communications port.

20. The method of claim 18, wherein the directing the received light includes directing the received light through the light guide to a terminal end of the light guide positioned adjacent to and at an upper end of the interface port.

* * * * *